United States Patent [19]

Dubin et al.

[11] Patent Number: 5,616,307

[45] Date of Patent: *Apr. 1, 1997

[54] BOILER OPERATION WITH DECREASED $NO_x$ AND WASTE WATER DISCHARGE

[75] Inventors: Leonard Dubin, Skokie; Vincent M. Albanese, Naperville; Roy A. Johnson, Glen Ellyn, all of Ill.

[73] Assignee: Nalco Fuel Tech, Naperville, Ill.

[ * ] Notice: The term of this patent shall not extend beyond the expiration date of Pat. No. 5,441,713.

[21] Appl. No.: 614,955

[22] Filed: Mar. 11, 1996

Related U.S. Application Data

[63] Continuation of Ser. No. 466,066, Jun. 6, 1995, abandoned, which is a continuation of Ser. No. 919,281, Jul. 24, 1992, abandoned, which is a continuation-in-part of Ser. No. 770,857, Oct. 3, 1991, Pat. No. 5,441,713, which is a continuation-in-part of Ser. No. 576,424, Nov. 27, 1990, abandoned, which is a continuation-in-part of Ser. No. 187,943, Apr. 29, 1988, abandoned.

[51] Int. Cl.$^6$ .................................................. C01B 21/00
[52] U.S. Cl. ............................................................. 423/235
[58] Field of Search ............................................. 423/235

[56] References Cited

U.S. PATENT DOCUMENTS

| | | | |
|---|---|---|---|
| 3,032,387 | 5/1962 | Andersen et al. | 23/2 |
| 3,214,454 | 10/1965 | Blaser et al. | 260/429.9 |
| 3,297,578 | 1/1967 | Crutchfield et al. | 252/99 |
| 3,303,139 | 2/1967 | Blaser et al. | 252/180 |
| 3,599,427 | 8/1971 | Jones et al. | 60/30 |
| 3,663,448 | 5/1972 | Ralston | 252/180 |
| 3,890,228 | 6/1975 | Hwa et al. | 210/58 |
| 3,900,554 | 8/1975 | Lyon | 423/235 |
| 4,208,386 | 6/1980 | Arand et al. | 423/235 |
| 4,303,568 | 12/1981 | May et al. | 260/29.6 |
| 4,325,924 | 4/1982 | Arand et al. | 423/235 |
| 4,640,793 | 2/1987 | Persinski et al. | 252/82 |
| 4,680,124 | 7/1987 | Young et al. | 210/697 |
| 4,744,949 | 5/1988 | Hoots et al. | 422/15 |
| 4,752,443 | 6/1988 | Hoots et al. | 422/13 |
| 4,756,881 | 7/1988 | Hoots et al. | 422/13 |
| 4,756,890 | 7/1988 | Tang et al. | 423/235 |
| 4,777,024 | 10/1988 | Epperly et al. | 423/235 |
| 4,780,289 | 10/1988 | Epperly et al. | 423/235 |
| 4,801,388 | 1/1989 | Fong et al. | 210/701 |
| 4,818,506 | 4/1989 | Lin et al. | 423/242 |
| 4,834,955 | 5/1989 | Mouché et al | 423/242 |
| 4,842,834 | 6/1989 | Burton | 423/235 |
| 4,904,413 | 2/1990 | Hoots et al. | 252/389.23 |
| 4,919,821 | 4/1990 | Fong et al. | 210/698 |
| 4,923,634 | 5/1990 | Hoots et al. | 252/389.2 |
| 4,959,156 | 9/1990 | Lickei et al. | 210/701 |
| 4,985,218 | 1/1991 | DeVita | 423/235 |
| 4,997,631 | 3/1991 | Hofmann et al. | 423/235 |
| 5,441,713 | 8/1995 | Dupin et al. | 423/235 |

FOREIGN PATENT DOCUMENTS

| | | |
|---|---|---|
| 1117395 | 2/1982 | Canada . |
| 49-030147 | 3/1974 | Japan . |
| 9106506 | 5/1991 | WIPO . |

OTHER PUBLICATIONS

Translated abstract of above Japanese patent.

*Primary Examiner*—Ferris Lander
*Assistant Examiner*—Thomas G. Dunn, Jr.
*Attorney, Agent, or Firm*—St Onge Steward Johnston & Reens LLC

[57] ABSTRACT

Pollution from industrial plants which produce $NO_x$ and waste water is reduced by utilizing waste water to prepare aqueous $NO_x$-reducing solutions. Total water hardness in the waste water is preferably maintained below 2500 ppm, silicate below 200 ppm and the calcium to magnesium ratio above 2:1. The aqueous $NO_x$-reducing solution will preferably contain hardness suppressing compostions in effective amounts.

21 Claims, 2 Drawing Sheets

BOILER OPERATION WITH DECREASED NO$_x$ AND WASTE WATER DISCHARGE

RELATED APPLICATIONS

This application is a continuation of application Ser. No. 08/466,066 filed on Jun. 6, 1995, now abandoned, which is a continuation of application Ser. No. 07/919,281 filed on Jul. 24, 1992 now abandoned, which is a continuation-in-part of commonly assigned U.S. Patent Application entitled "Hardness Suppression In Urea Solutions", filed Oct. 3, 1991, in the names of L. Dubin, W. R. Epperly, B. N. Sprague, and T. von Harpe, having Ser. No. 07/770,857, now U.S. Pat. No. 5,441,713, which in turn is a continuation-in-part of commonly assigned U.S. Patent Application entitled "Composition for Introduction Into a High Temperature Environment" having Ser. No. 07/576,424, filed Nov. 27, 1990, now abandoned, in the names of W. R. Epperly, B. N. Sprague, and T. von Harpe, which in turn is a continuation-in-part of U.S. patent application Ser. No. 07/187,943, filed on Apr. 29, 1988, (now abandoned) also in the names of Epperly, Sprague, and von Harpe, the disclosures of which are incorporated herein by reference.

TECHNICAL FIELD

The invention relates to improving the environmental impact of industrial plants which generate waste water and produce nitrogen oxides (NO$_x$). The invention has particular advantage in installations where waste waters having high concentrations of dissolved or suspended solids are produced and injection of aqueous solutions of NH-containing NO$_x$-reducing agents is feasible. Processes and compositions are provided.

Aqueous solutions of NH-containing NO$_x$-reducing agents such as urea, its hydrolysis products and related amidozine-generating materials, are useful in reducing the environmental damage caused by NO$_x$ from large-scale combustion. Carbonaceous materials, including the typical hydrocarbon fuels such as coal, oil and gas, as well as refuse, are burned in increasing amounts each year. This combustion is a primary source of steam for power generation and produces a variety of pollutants which must be removed from the effluents or adverse consequences to the environment will be suffered. Moreover, waste water is produced when spent steam is condensed for recycling or purified by reverse osmosis, or other industrial process waters are cooled in recirculating cooling towers. These waste waters and others produced by industrial processes contain considerable quantities of dissolved and dispersed solids. There are economic, environmental and regulatory restrictions on the discharge of waste waters.

The process for cooling steam typically entails indirect heat exchange (such as in a tube and shell heat exchanger) with cooling water. The cooling water can then be cooled in a cooling tower by contact with air and resulting evaporation. The water lost by evaporation can be replaced by the addition of fresh "make-up" water, but the solids content of the water lost by evaporation is left behind and, in time, builds up. It has been the practice to treat cooling water, boiler water and other process water to prevent scale build up and to periodically "blow down" a portion, treat it to reduce the solids content, and then to return purified water to the process. Solids removal is expensive but is required in most areas because of legal limits on the discharge of waste water. Indeed, some states restrict water discharge to foster conservation.

Mandates for limiting both air and water pollutant discharge and water conservation must be met, and must be met economically, for businesses to operate. It would be advantageous to have a process which decreased the costs of meeting these environmental goals.

BACKGROUND ART

Among the pollutants in combustion effluents are nitrogen oxides, referred to as a group as NO$_x$. A number of strategies have been developed for reducing NO$_x$ levels, prominent among which is selective non-catalytic reduction (SNCR), disclosed for example by Lyon in U.S. Pat. No. 3,900,554 and by Arand et al in U.S. Pat. Nos. 4,208,386 and 4,325,924. Briefly, these patents disclose that ammonia (Lyon) and urea (Arand et al) can be injected into hot combustion gases to selectively react with NO$_x$ and reduce it to diatomic nitrogen and water.

The attainment of consistent, high reductions in NO$_x$ is a matter of considerable engineering and chemistry. These gas-phase SNCR reactions typically involve NO$_x$ levels of 100 to 1500 parts per million and either urea or ammonia at from one to three times the amount stoichiometrically required. Thus, the reaction requires mating of the reactive materials in high dilution, and typically starts with the NO$_x$-reducing materials in aqueous droplets. The NO$_x$-reducing material must be dispersed uniformly and continuously throughout the gas stream being treated to achieve contact with the NO$_x$ molecules in the temperature range effective for reaction, e.g., from 1600° to 2000° F.

Selective catalytic reduction (SCR) is similar to SNCR, but entails the use of a catalyst and operates at lower temperatures, generally within the range of from 250° to 900° F. See in this regard U.S. Pat. Nos. 3,032,387 and 3,599,427. The use of catalysts is effective but is sensitive to particulates and sulfur compounds and increases initial and operating costs in many situations.

Consistency in NO$_x$ reduction, especially while maintaining low levels of ammonia slip, is made even more difficult by the fact that the temperature across any plane varies significantly at any given time and shifts with changes in rate of combustion (i.e., load) which is common for boilers used in power generation and other combustors. To maximize NO$_x$ reduction, the art has developed to the state where chemicals can be injected in stages (U.S. Pat. No. 4,777,024 to Epperly et al), with variation in location of injection and chemical formulation as is necessary to meet the temperature and compositional variations in the gas stream being treated (U.S. Pat. No. 4,780,289 to Epperly et al). All piping, pumps, nozzles and associated equipment must be kept clean and clear for the objectives to be met. Frequent draining, flushing and washing are not possible without severe consequences.

In copending, commonly-assigned U.S. patent application Ser. No. 07/576,424, there is disclosed a low-cost composition for reducing nitrogen oxides which improves delivery of active chemicals to a high temperature zone by reducing the tendency of lines and nozzles to clog or otherwise become obstructed. As part of that disclosure, there are identified several sequestering agents and antiscalants to mitigate the effects of water hardness.

As part of work described in copending, commonly-assigned U.S. patent application Ser. No. 07/770,857, it was found that the nitrogen-based NO$_x$-reducing agents which release the amidozine radical, produce a greater scaling problem than might ordinarily have been expected. This was found to be especially true where used with dilution water which has significant hardness such as calcium, magnesium and carbonate.

The reduction of scale in cooling towers by treating the cooling water has been the subject of study for years and has resulted in a large number of patents identifying a wide variety of chelants and threshold inhibitors.

Chelation is the binding between an inhibitor and a metal ion (e.g., Ca, Mg, Fe ions) at two or more sites. Among the known chelants are ethylene diamine tetracetic acid (EDTA), nitrilotriacetic acid (NTA), N-hydroxy ethyl ethylene diamine tetracetic acid, hydroxyethylene diamine triacetic acid (HEDTA), citric acid, diethylenetriamine pentacetic acid, gluconic acid, tartaric acid, glucoheptonic acid, and the water-soluble salts of these. The complexation of a metal ion with a chelant scale inhibitor results in dissolution of the metal ion. Chelation requires a 1:1 mole ratio of chelating agent to metal ion, and is therefore stoichiometric.

Threshold inhibition refers to the phenomenon where inhibitors prevent precipitation of mineral salts when added in amounts which are less than the amount of the scaling ion. Threshold inhibitors are typically viewed as acting through particle dispersion by steric stabilization and electrostatic repulsion, and retarding crystal growth by adsorption onto and blocking active growth sites. The ratio of threshold inhibitor to scaling ions is generally much smaller and is substoichiometric. Typically, threshold inhibitors (e.g., polymers, phosphonates) are applied at a dosage ratio of 1:10,000 to 1:2 ppm active inhibitor/ppm total hardness or particulate matters such as silt, clay or precipitate.

Representative of the patents disclosing compositions for treating cooling water are: Canadian Patent 1,117,395, to L. Dubin and J. A. Baumbach which teaches the use of phosphonocarboxylic acids and certain acrylic acid polymers; U.S. Pat. No. 3,663,448 to P. H. Ralston which teaches the use of combinations of amino phosphonate compounds and polyacrylic acid derivatives; U.S. Pat. No. 3,890,228 to C. M. Hwa, D. G. Cuisia and J. S. Gray, which teaches the use of combinations of polyacrylates and polymethacrylates with organo-phosphonic acids; U.S. Pat. Nos. 4,801,388 and 4,919,821, D. W. Fong, J. E. Hoots and J. Kneller which disclose various hydrocarbon polymers containing amido functionalities prepared by postpolymerization derivatization; and U.S. Pat. Nos. 4,752,443 and 4,923,634 to J. E. Hoots, D. A. Johnson, D. W. Fong and J. F. Kneller which teach a composition comprising a water-soluble inorganic phosphate capable of inhibiting corrosion in an aqueous alkaline environment and a hydrocarbon polymer containing an N-substituted acrylamide polymer with a specific structure.

Waste waters, such as blowdown water from cooling tower reservoirs treated with chemicals of the above and other types, often have solids concentrations which stress the effectiveness of scale control additives employed therein. Reducing the solids concentration in these waste waters requires either chemical or physical separation, both of which add costs. It would be desirable to enable replacement of at least a portion of the waste waters with fresh make-up water without either discharging the waste water or incurring costs required for treatment to reuse the water.

DISCLOSURE OF INVENTION

It is an object of the invention to decrease the environmental impact of plants which generate waste water and $NO_x$-containing combustion effluents.

It is an object of the invention to improve the environmental impact of processes which generate steam by the combustion of fuels and utilize it for various purposes.

It is an object of the invention to decrease the environmental impact of electric power generation processes which utilize steam generated by the combustion of fuels.

It is another object of the invention to lessen the environmental impact of heating processes which utilize steam generated by the combustion of fuels.

It is a further object of the invention to moderate the environmental impact of combined heating and electric power generation processes which utilize steam generated by the combustion of fuels.

It is a more specific object of one aspect of the invention to reduce the environmental impact of processes which generate steam utilizing heat derived from the combustion of fuels and utilize it for various purposes including heating and electric power generation, by decreasing the discharge of $NO_x$ in the combustion effluents and soluble and dispersed solids in waste water employed during processing.

It is another specific object of the invention to reduce the environmental impact of processes which generate steam by the combustion of fuels and utilize it for various purposes including heating and electric power generation, by decreasing the discharge of $NO_x$ in the combustion effluents and soluble and dispersed solids in waste water employed during processing, in particular where the $NO_x$-reducing agents are NH-containing materials such as urea, its hydrolysis products, and related amidozine-generating materials.

These and other objects are achieved by the present invention which provides improved processes and compositions.

In one aspect, the invention provides an improvement in a process for controlling emissions, conserving water usage and reducing waste water discharge, the process being of the type wherein fuel is burned with air to produce combustion gases containing $NO_x$, and an aqueous solution of $NO_x$-reducing agent is introduced into the combustion gases under conditions effective to reduce the $NO_x$ concentration thereof, the improvement comprising: mixing a $NO_x$-reducing agent with waste water and scale inhibiting composition in sufficient quantities to provide an aqueous solution of the $NO_x$-reducing agent effective for reducing the $NO_x$ concentration of the combustion gases while moderating the tendency for precipitation of hardness factors.

In another of its aspects, the invention provides an improvement in a process for producing and utilizing steam while controlling emissions, the process being of the type wherein fuel is burned with air to produce hot combustion gases containing $NO_x$, heat is transferred from the combustion gases to boiler water to produce steam, steam is passed to a device which utilizes at least a portion of the energy of the steam and produces spent steam, the spent steam is cooled by indirect heat transfer to produce liquid boiler water, and an aqueous solution of $NO_x$-reducing agent is introduced into the combustion gases under conditions effective to reduce the $NO_x$ concentration thereof, the improvement comprising: separating a portion of the boiler water from the remainder as boiler blowdown water, subjecting the blow down water to purification to prepare purified water for recycle to the boiler and reject water and mixing reject water with $NO_x$-reducing agent in sufficient quantity to provide an aqueous solution of the $NO_x$-reducing agent effective for reducing the $NO_x$ concentration of the combustion gases.

In one specific aspect, the invention provides an improvement in a process for producing and utilizing steam while controlling emissions, the process being of the type wherein fuel is burned with air to produce hot combustion gases containing $NO_x$, heat is transferred from the combustion gases to water to produce steam, steam is passed to a device which utilizes at least a portion of the energy of the steam and produces spent steam, the spent steam is cooled by indirect heat transfer with cooling water, the cooling water is cooled by direct contact with air causing evaporation, and an aqueous solution of $NO_x$-reducing agent is introduced into the combustion gases under conditions effective to reduce the $NO_x$ concentration thereof, the improvement comprising: separating a portion of the cooling water from the remainder and mixing it with $NO_x$-reducing agent in sufficient quantity to provide an aqueous solution of the $NO_x$-reducing agent effective for reducing the $NO_x$ concentration of the combustion gases.

To achieve and maintain the desired levels of various solids in the cooling water while maximizing the utilization of blow-down water as dilution water for the $NO_x$-reducing agent and avoiding the problems caused by hardness factors in the presence of urea or other NH-containing compositions, a portion of the cooling water blowdown is preferably separated, treated to reduce the hardness of that portion and is then recombined with the remainder of the cooling water. In one aspect, the portion of the cooling water which is treated is contacted with an additive to reduce the hardness of that portion. Desirably, solids are precipitated and removed. In another, the portion of cooling water is treated by reverse osmosis. In its preferred aspects, the process includes the further step of combining the resulting treated water and make-up with the remainder of the cooling water. In one preferred embodiment the total hardness in the cooling water is maintained at from 400 to 2500 ppm, the silicate is maintained at less than 200 ppm, and the calcium to magnesium ratio is maintained at greater than 2:1.

According to one of the more preferred aspects of the invention, an aqueous solution of $NO_x$-reducing agent is prepared by admixing cooling water, an effective NH-containing composition, and a hardness-suppressing composition comprising at least one member selected from the group consisting of polymers, phosphonates, chelants, phosphates and mixtures of these, in an amount effective to moderate the tendency for precipitation of hardness factors. The concentration of the hardness-suppressing composition will preferably be sufficient to enable protection against calcium scale formation at calcium concentrations of from 400 to 2500 parts per million. It is preferred that the NH-containing composition comprise a member selected from the group consisting of ammonia, urea, urea precursors, urea hydrolysis products, carbamates, ammonium carbonate, ammonium bicarbonate, cyanurates, ammonium salts of organic acids, other ammonium salts, and other amidozine-generating compositions and mixtures of these. The pH of these aqueous solutions is preferably within the range of from 7 to 11.

BRIEF DESCRIPTION OF THE DRAWINGS

The invention will be better understood and its advantages will be better appreciated from the following detailed description, especially when read in light of the accompanying drawings wherein.

DESCRIPTION OF PREFERRED EMBODIMENTS

The invention will be described below with reference to several representative processes and compositions to fully describe its significant features while avoiding unnecessary detail. It will be understood, however, that the invention is of broad applicability.

The present invention recognizes that industrial plants, in addition to creating $NO_x$ and other air-borne pollutants, produce waste water in related processes which can be an economic and environmental burden. Discharge of the waste water is usually restricted because of the dissolved and suspended solids content. In some areas, water conservation is the purpose for restricting the discharge of water as waste. The invention enables removal of the water from these waste waters by integrating waste water disposal with $NO_x$ reduction.

As set forth in the references identified above and those additional ones cited in the parent application, the known processes for $NO_x$ reduction involve preparing an aqueous solution of $NO_x$-reducing agent, transporting the solution to the gas stream through conduits effective for this purpose, and introducing the solution into the gas stream at a concentration and at a rate effective to reduce $NO_x$ under the conditions prevailing in the gas stream. This type of process can be practiced with or without a catalyst, by selective gas-phase reactions. Without a catalyst the process is selective, non-catalytic reduction (SNCR), and with a catalyst it is selective catalytic reduction (SCR). Hybrid processes can also be practiced.

Experience has shown that the best chemical agents for reducing $NO_x$ in combustion effluents are those which generate the amidozine radical ($NH_2\cdot$). This radical operates through a complex series of reactions, which have rates dependent on component concentration and temperature, to convert $NO_x$ to water and diatomic nitrogen. These amidozine-generating $NO_x$-reducing agents can most effectively be employed in controlled $NO_x$-reducing processes as aqueous solutions which, as disclosed in copending U.S. patent application Ser. No. 07/770,857, are particularly susceptible to hardness which must be suppressed.

The terms "suppress hardness" and "hardness suppressing" refer to the effect or property of a composition to reduce the tendency of hardness factors in solution to form scale or precipitates. Compositions are effective if scale or precipitation is reduced by any mechanism, but chelation and threshold inhibition are the typical mechanisms. While "scale" is considered by some as hard, adherent, heat-transfer hindering and nozzle-orifice-blocking solids, no differentiation is made here between types of scale or between scale and other forms of "precipitates".

Hardness factors of particular concern include $Ca^{2+}$, $Mg^{2+}$, $SO_4^{2-}$, $Cl^-$, $Fe^{2+}$, $Fe^{3+}$, $HCO_3^-$, silica $Mn^{2+}$, $Mn^{4+}$, $Cu^+$, $Cu^{2+}$, $Zn^{2+}$, $PO_4^{3-}$ and $CO_3^{2-}$, and can include various particulates and other impurities in the water and other solution ingredients. The hardness factors and amounts present will vary with the objectives of specific embodiments. Throughout this description, concentrations of hardness factors (e.g., "H", Ca, Mg) are expressed as calcium carbonate. As noted above, problems normally associated with these hardness factors are exacerbated by the presence of amidozine-generating $NO_x$-reducing agents.

Figure 1:
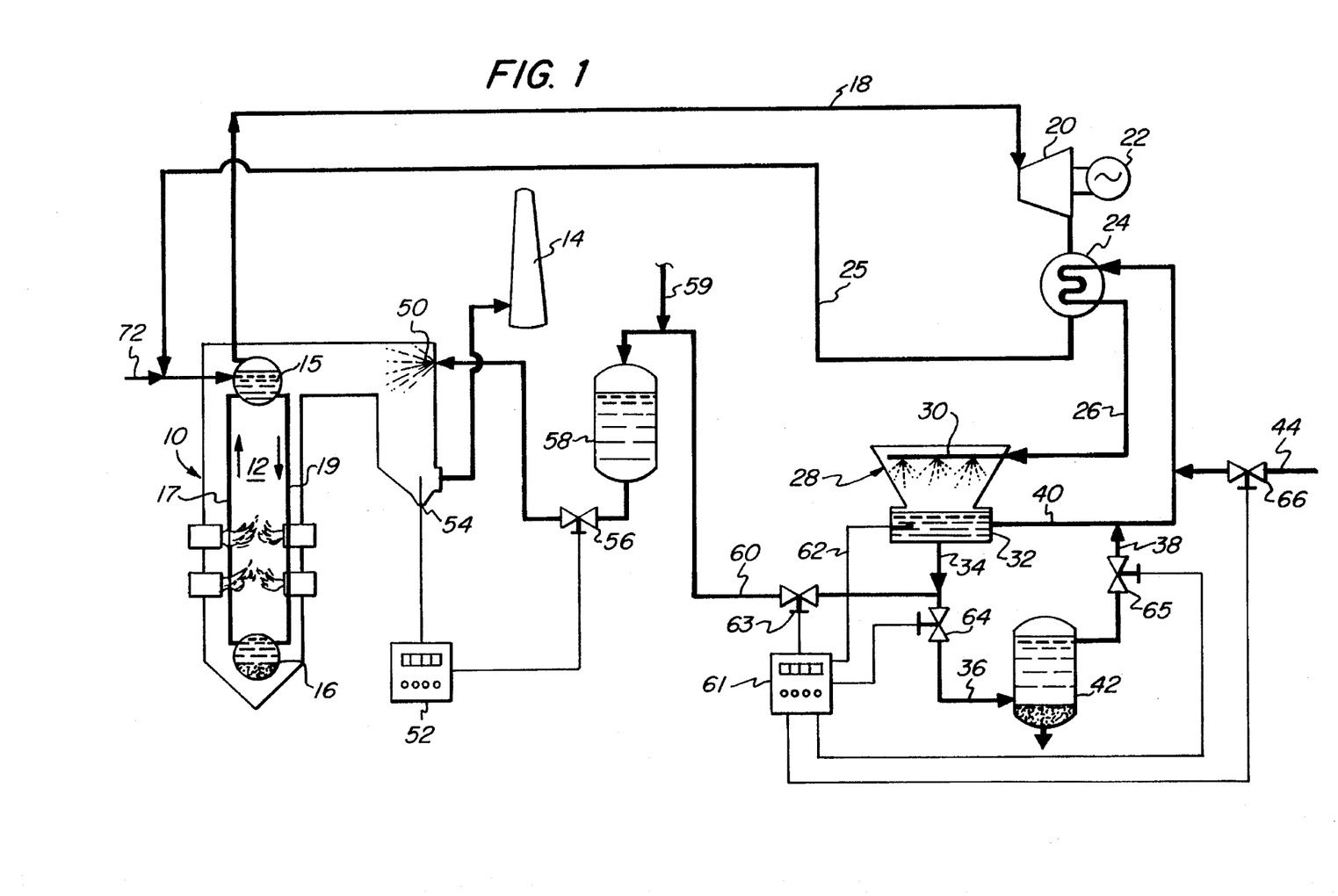
FIG. 1 is a schematic diagram of one preferred process flow scheme of the invention wherein cooling tower blowdown water is used to prepare an aqueous solution of $NO_x$-reducing agent for effluent treatment.

Reference is now made to FIG. 1 which shows a representative steam generation and utilization system which is improved according to the invention. FIG. 1 shows a large industrial boiler 10 which burns a fuel with air in combustion zone 12. The hot combustion gases have heating value for the production of steam and contain $NO_x$ and other pollutants which must be reduced prior to discharge from the stack 14. While the description which follows will focus on the reduction of $NO_x$ levels in this exemplary effluent situation, it will be recognized by those skilled in the art that $SO_x$ particulates and other effluent components are also subject to control. Effluents from other types of combustion will also need treatment for $NO_x$ removal. Among these are effluents from large utility boilers, circulating fluidized bed boilers, and gas turbines.

Hot combustion gases from combustion zone 12 heat water and produce steam which is utilized for its heat value and produces spent steam which is cooled and recycled. The boiler 10 is shown to include a steam drum 15, a mud drum 16, riser 17 and downcomer 19. In operation, the steam is produced in steam drum 15 for circulation to external steam utilizing equipment via line 18. Cooler water flows from steam drum 15 to mud drum 16 by convection through downcomer 19 as hotter water flows in the opposite direction through riser 17. The steam can be utilized to provide heat as such or to produce mechanical energy, such as in turbine 20, which can in turn be used to produce electrical energy via a generator 22. A preferred utility of the invention is in a plant designed for the cogeneration of heat and electricity. The spent steam is then cooled by indirect heat exchange with cooling water, such as in a tube and shell heat exchanger represented as 24 in FIG. 1. Once cooled, the resulting condensate from the spent steam can be recirculated to the boiler 10.

The cooling water is passed from heat exchanger 24 via line 26 to cooling tower 28 where it is cooled by direct heat exchange with air. FIG. 1 shows the cooling water being sprayed at 30 and descending through air which can be renewed by natural or forced convection. The contact of air and water transfers sensible heat from the water to the air and cools both by evaporation of a portion of the water. The cooled cooling water is collected in reservoir 32.

Evaporation necessitates supplying additional make-up water to maintain a desired water level. Each addition of make-up water contains solids, and solids are scrubbed from the air used for cooling. Accordingly, dissolved and suspended solids tend to build up in the cooling water. It is typical to separate a portion of this water for discharge or treatment. This portion, such as is shown taken off via line 34 in FIG. 1, is called a blowdown stream.

The blowdown water can be treated, mechanically or chemically, to reduce its hardness and then recycled to the remainder of the cooling water in reservoir 32, such as via lines 36, 38 and 40. The treatment can be by addition of chemical softening agents which typically precipitate out selected species such as in vessel 42. For example, lime can be added to precipitate out salts such as magnesium silicate to reach the target levels for these materials as is explained further below. Alternatively, reverse osmosis can be employed, where pressure is employed to force water through a semi-permeable membrane to leave behind a brine bearing the greatest concentration of dissolved solids. Further available techniques include electrodialysis reversal, other bipolar membrane technology, and vapor recompression techniques. Fresh make-up water can be added, such as via line 44, in amounts required.

It is an advantage of the invention that the amount of blowdown water which must be treated for recombining with the remainder of the cooling water can be greatly reduced and preferably eliminated entirely. In some embodiments, the invention has the advantage of not only reducing waste water discharge problems to stay within regulation, but also the advantage of reducing costs of operation, and, for new installations, of capital equipment.

To effectively reduce $NO_x$ in the combustion effluent gases, it is desired to introduce an aqueous solution of $NO_x$-reducing agent into the effluent at the desired temperature zone within the boiler, or other combustor or flue extending from it. Effluent temperatures will typically be greater than about 500° F. and can be as high as about 1900° F., even 2100° F. and higher. The temperature of the effluent at the point of introduction of the $NO_x$-reducing agent is typically within the range of 1500° to 2000° F. for SNCR systems. For SCR operations it will typically be within the range of from 200° to 1000° F.

An aqueous solution of $NO_x$-reducing agent is shown being introduced into the effluent by injection at 50. Typically an injector is employed and generally comprises a conduit, sometimes fitted at the tip with a nozzle, extending into the effluent. Apparatus of varying degrees of sophistication are known for introducing $NO_x$-reducing compositions into a high temperature environment. Some comprise coaxial, multi-tubular structures, such as those disclosed by Burton in U.S. Pat. No. 4,842,834, and by DeVita in U.S. Pat. No. 4,985,218, the disclosures of each of which are incorporated herein by reference.

A portion of effluent or other gas is often employed to help atomize and disperse the solution of $NO_x$-reducing agent. The spray or injection pattern is defined with precision, often with the aid of computer to assure good distribution and reaction. The incorporation of a hardness-suppressing composition as described below in greater detail and in copending U.S. patent application Ser. No. 07/770,857, helps assure operation according to the defined pattern by minimizing injector fouling in this severe environment where the $NO_x$-reducing agents tend to pronounce the effects of hardness. It is desirable to incorporate hardness-suppressing compositions in amounts effective to increase the stability of hardness factors, and thereby moderate the tendency for precipitation of hardness factors such as in the conduits, nozzles, or storage vessels.

The control of SNCR and SCR systems is difficult. These processes require individual molecules of $NO_x$-reducing agents (or, more precisely, free radical components of them, e.g., the amidozine radical) to react with individual $NO_x$ molecules—both the reducing agent and the $NO_x$ being present at very low (e.g., ppm) concentrations. FIG. 1 shows a controller 52 which receives a first signal from means 54 for sensing the $NO_x$ concentration of the effluent, and includes means for generating a control signal responsive to that first signal for controlling the supply of aqueous solution of $NO_x$-reducing agent to the effluent to injector 50 by regulating a valve or other flow-controlling means 56.

A control system such as disclosed in PCT Patent Application Serial No. PCT/US89/04949, filed Nov. 3, 1989 in the names of W. R. Epperly and J. Peter-Hoblyn, can be effective for this purpose and the disclosure of that application is incorporated herein by reference. The control system should be adequate to vary concentration and/or composition of reducing agent as boiler load and other factors cause the $NO_x$ concentration and effluent temperature profile to vary. Any mismatch will cause final effluent $NO_x$ or other pollutant levels to be excessive.

The solution of $NO_x$-reducing agent is prepared by diluting a suitable $NO_x$-reducing agent and hardness-suppressing composition with water and holding the resulting aqueous solution in a vessel such as 58. Additional water or solution can be added as necessary such as through line 59.

The preferred $NO_x$-reducing agents will be NH-containing compositions and will comprise at least one member selected from the group consisting of ammonia, urea, urea precursors, urea hydrolysis products, carbamates, ammonium carbonate, ammonium bicarbonate, cyanurates, ammonium salts of organic acids, other ammonium salts (e.g., inorganic ammonium salts), other amidozine-generating compositions and mixtures of these.

The $NO_x$-reducing agents based on carbamates and urea hydrolysates, such as those described in U.S. Pat. No. 4,997,631 to Hofmann et al, and U.S. patent application Ser. No. 07/561,154, filed Aug. 1, 1990 in the names of von Harpe et al, particularly stress the ability of the solution to retain hardness factors in soluble form. This patent and the application are incorporated herein by reference. Accordingly, the present invention is of particular advantage when dealing with materials of this type or its components such as ammonium or calcium carbonates, bicarbonates and carbamates.

The presence of uncontrolled hardness in urea and other NH-containing compositions can cause a variety of adverse effects. It can result in scaling with consequent flow restriction and blockage of conduits and nozzles. Large pieces of scale can flake off and cause instantaneous blockage. At high temperature, flow restriction will not only destroy the desired spray pattern, but can cause further flow problems as the heat increases the viscosity of the fluid, causes localized boiling, or changes the chemical composition of the $NO_x$-reducing composition. In addition, the hardness factors can combine with the active chemicals to form insoluble salts and, cause precipitation of the active chemicals even at ambient temperatures. An extensive, but representative, listing of suitable hardness-suppressing chemicals is listed below under the heading HARDNESS SUPPRESSING CHEMICALS (starting at page 26).

The $NO_x$-reducing compositions employed by the invention will typically be prepared and shipped as concentrates which are diluted for use. Typically, these concentrates will contain 25 to 65% urea and 0.05 to 1.0% of an effective hardness-suppressing composition, more preferably from 40 to 55% urea, e.g., 50%, and from 0.1 to 0.75%, e.g., 0.5%, of the hardness-suppressing composition. This concentrate is diluted as required to achieve a urea concentration effective under the conditions. Typically, dilution to concentrations of from 5 to 25% urea are effective. Lower concentrations (e.g., 1 to 5%) may be desired. In the preferred embodiments, the concentration of certain hardness factors in the blow-down water used for dilution, will be kept within prescribed ranges to assure satisfactory operation.

FIG. 1 also illustrates a simple system for controlling blowdown of cooling water, its treatment to maintain tolerances, its utilization as dilution water for $NO_x$-reducing agent and the supply of make-up water to the cooling tower 28. A controller 61 receives a signal indicative of the chemical composition of the cooling water in reservoir 32 via line 62. This signal is processed and according to a program generates a control signal to either open valve 63 to discharge the blow-down water for use as dilution water and/or to open valve 64 to enable treatment of the water at 42. Typically, a surge tank (not shown) would be employed to hold discharged blowdown water until called for in the preparation of the aqueous solution of $NO_x$-reducing agent. The drawing illustrates a chemical separation of hardness factors as a precipitate, but a physical separation by reverse osmosis could be employed if desired. The controller will preferably also generate signals to open and close valve 65 to control return of treated blow-down water to the reservoir and valve 66 to control supply of cooling water make-up.

Preferably, the aqueous solution of $NO_x$-reducing agent is prepared by admixing cooling water, an effective NH-containing composition, and a hardness-suppressing composition comprising at least one member selected from the group consisting of polymers, phosphonates, chelants, phosphates and mixtures of these, in an amount effective to moderate the tendency for precipitation of hardness factors. It is preferred that the concentration of the hardness-suppressing composition is sufficient to enable protection against calcium scale formation at calcium concentrations of from 400 to 2500 parts per million. The pH of the aqueous solution will be above 5, preferably within the range of from 7 to 11.

There will follow a more complete listing of representative effective materials, but preferred aqueous solutions comprise both a water-soluble polymer and a phosphonic acid or salt as hardness-suppressing compositions. Preferred are hardness-suppressing compositions comprising a member selected from the group consisting of polyacrylic acid and 2-acrylamido-2-methylpropane sulfonic acid. Of these, preferred compositions comprise a phosphonate selected from the group consisting of: 1-hydroxy ethylidene-1,1-diphosphonic acid and 2-phosphono-1,2,4-tricarboxy butane. It is also useful to further employ a surfactant.

It is an advantage of the invention that, despite the sensitivity of urea or like solutions to suffer from hardness effects, the dilution water can be a waste water stream from a cooling system blowdown stream and have unusually high hardness levels. This facilitates the non-polluting disposal of these streams. Such a stream 60 is shown coming from a reservoir of cooling water 32 in cooling tower 28 via line 34.

For cooling tower blowdown water used as dilution water, a hardness-suppressing composition can contain the above combinations but chelants are per se not as important, and phosphates (including esters) may be employed for corrosion control.

Cooling water blowdown typically has very high hardness levels although they are preferably kept to less than about 2500 ppm total hardness. For the present invention, it is preferred to employ make-up water having a total hardness of less than 2250 ppm. In addition the weight ratio of calcium to magnesium should be less than 20:1, preferably less than 15:1, and the silicate level is preferably maintained at less than 150 ppm. These levels can be achieved by diluting or otherwise treating the blowdown water prior to use for dilution, or simply setting these as targets for operation of the cooling tower. With these very high levels of hardness, it is preferred to use relatively low concentrations of $NO_x$-reducing agent, e.g., less than 10% and preferably at 5% or below in the case of the highest levels with urea or urea hydrolysate.

To enable the use of these high hardness concentrations, it will be necessary to employ effective amounts of dispersants selected form the group consisting of polymers and phosphonates. In an exemplary case a hardness-suppressing additive package comprising (on a solids basis) 3.25% polyacrylic acid (PAA), 12.0% 2-phosphono-1,2,4-tricarboxybutane (PBTC), 44.4% of a 37% actives acid form terpolymer of acrylamide/acrylic acid/sulfomethyl acrylamide (pH-5) (AMS), and 0.75% 1-hydroxyethylidene-1,1-diphosphonic acid (HEDP), is effective at 2.5% urea in a solution containing 2250 ppm and below total hardness with magnesium, calcium and silicate within the above limits. This additive package is effective at a level of about 500 ppm.

In solutions having up to 20% urea, with 900 ppm or less total hardness, 200 ppm or less magnesium, 60 ppm or less silicate and a calcium to magnesium ratio of 5:1 or less, the above additive package can be employed at effective levels, e.g., about 300 to 700 ppm.

At up to about 600 ppm total hardness, magnesium levels of less than 150 ppm and calcium to magnesium ratios of from 2:1 to 3:1, the dispersant level can be decreased even at urea concentrations up to 30%. The AMS and PBTC can be dispensed with in an additive package at levels of 4000 to 6000 ppm of product containing only the polyacrylic acid and HEDP.

The mechanisms by which the scale control agents of this invention work in urea solutions prepared with cooling water blowdown as well as other kinds of waste water solutions are by either threshold activity alone or in combination with, chelation. Threshold mechanisms are the primary factor and are the preferred method because of cost and efficiency. Chelation is typically effective in softer waters such as from high pressure steam boilers.

Threshold inhibition refers to the phenomenon where inhibitors prevent precipitation of mineral salts when added in amounts which are less than the amount of the scaling ion. Threshold inhibitors are typically viewed as acting by particle dispersion through steric stabilization and electrostatic repulsion, and retarding crystal growth by adsorbing onto and blocking active growth sites. Chelation is the binding between the inhibitor and the metal ion (e.g., Ca, Mg, Fe ions) at two or more sites.

The complexation of metal ion with chelant scale inhibitor results in dissolution of the metal ion. Chelation requires a 1:1 mole ratio of chelating agent (e.g., citric acid, EDTA, etc.) to metal ion, and and is therefore stoichiometric. The ratio of threshold inhibitor to scaling ions is generally much smaller and is substoichiometric.

Typically, threshold inhibitors (e.g., polymers, phosphonates) are applied at a dosage ratio of 1:10,000 to 1:2 ppm active inhibitor/ppm total hardness or particulate matters such as silt, clay or precipitate.

Figure 2:
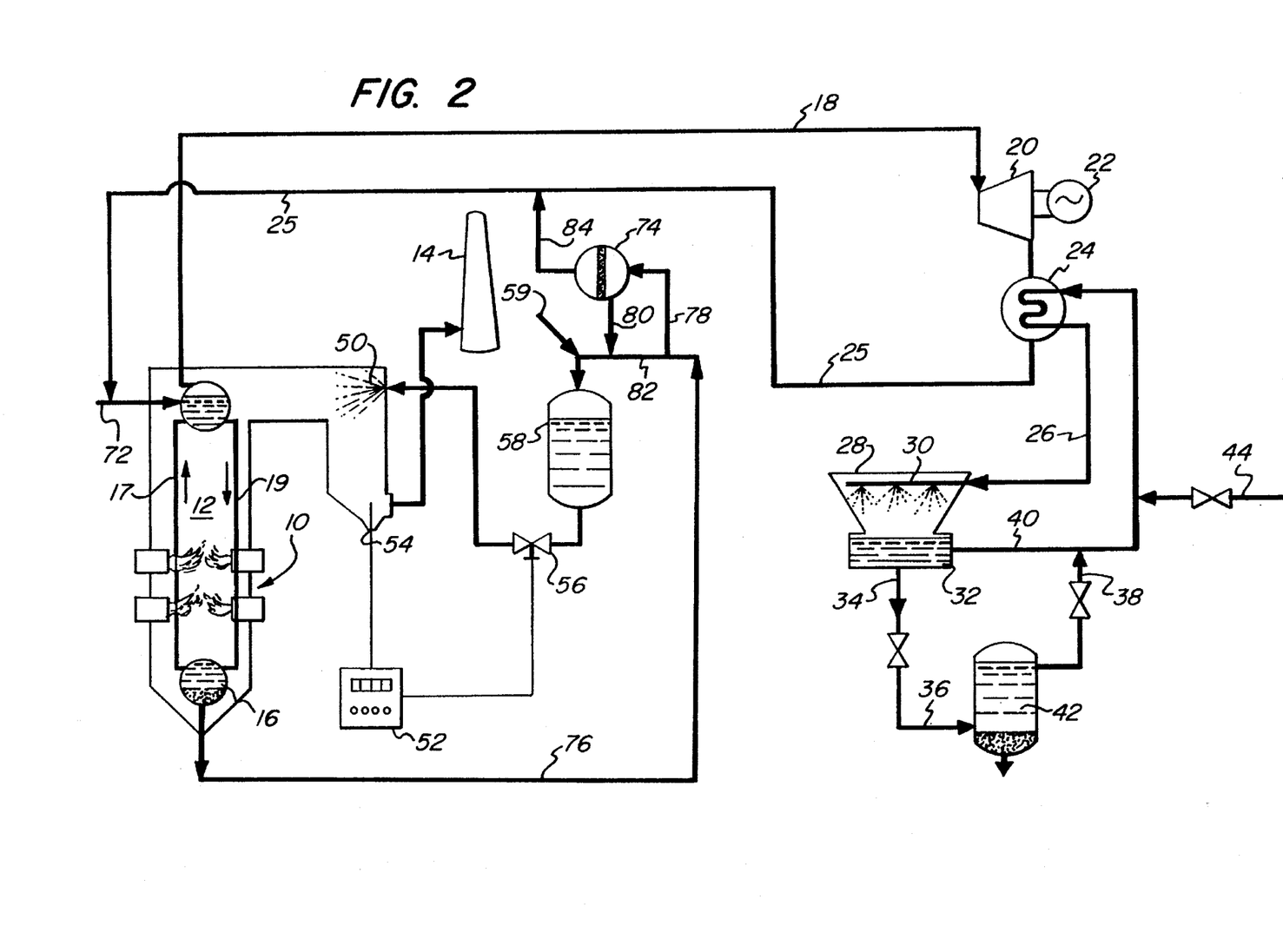
FIG. 2 is a schematic diagram of another preferred process scheme wherein boiler water blowdown is employed to prepare an aqueous solution of $NO_x$-reducing agent for effluent treatment.

FIG. 2 also illustrates an industrial plant which generates steam and utilizes the steam to operate a turbine, but in this case employs at least a portion of the boiler blowdown water as dilution water for the aqueous solution of $NO_x$-reducing agent. The process represented in FIG. 2 is the same in many regards with that of FIG. 1, and like parts are given like reference numbers. The drawing, however, shows line 76 drawing boiler blowdown water from mud drum 16 for use as dilution water for the $NO_x$-reducing agent and further shows make-up boiler water being introduced via line 72.

The use of boiler water blowdown presents a less severe environment than that of cooling water blowdown; but as with the cooling water situation described above, the actual operating requirements of the boiler will determine the exact treatment necessary. For example, some low-pressure steam operations operate at pressures of less than 100 psig and can tolerate up to 5000 ppm total hardness. Blowdown water from these boilers may require substantial dispersant levels, e.g., several thousand ppm, and may require treatment to reduce solids prior to use in the solution of $NO_x$-reducing agent. High-pressure boilers, on the other hand, cannot tolerate hardness, and blowdown water from these boilers can be treated to separate a high solids fraction portion from a purified portion which is recycled to the steam drum.

FIG. 2 shows a reverse osmosis unit 74 which receives blowdown from the mud drum 16 via lines 76 and 78 and separates it into a solids rich fraction which is passed via lines 80 and 82 to vessel 58, and a solids poor fraction which is recycled back to steam drum 15 via lines 84 and 25. Where the blowdown stream is above 2500 ppm total hardness or as otherwise desired, reverse osmosis can be employed to reduce solids in the poriton fed to line 82. In this case, line 84 would go to line 82, and line 80 would go to discharge, such as a sedimentation pond.

For boiler blowdown water used as dilution water, the hardness-suppressing composition can contain: chelant(s); polymer(s); a combination of chelant(s) and polymer(s); a combination of phosphonate(s) and polymer(s); a combination of chelant(s), phosphonate(s) and polymer(s); and combinations of any of these with a phosphate such as tripolyphosphate which is employed for scale control. For waste water treatment, cationic and anionic polymeric dispersants can be important.

In addition to boiler and cooling tower blowdown water, waste or impure waters from other sources can also be employed. These other sources include: river water; lake water; various industrial pond waters, including sedimentation ponds, cooling ponds, evaporation ponds, ash ponds, and sumps; brines from various sources such as sea water and concentrates from reverse osmosis; waste water streams from various cleaning processes, including air heater wash water; and the like. By analysis of the particular waste water stream, it is possible to employ the correct combination of hardness-suppressing treatment agents in the NH-containing concentrate itself or as a separate additive package to be added as part of the final aqueous solution. An additive of this type is preferably dispersed in the waste water prior to addition to the concentrate or into the NH-containing concentrate prior to dilution.

Hardness Suppressing Chemicals

Polymers

Any water-soluble polymer which is effective to suppress hardness can be employed. A wide variety of polymers is commercially available. Among these are water-soluble acrylic polymers. Exemplary of these are polymers and copolymers (including those which are substituted or derivatized) of acrylic acid, methacrylic acid, ethyl acrylic acid, acrylamide, esters of acrylic monomers, itaconic acid, and maleic acid or its anhydride as described, for example in U.S. Pat. Nos. 3,890,228, 4,680,124, 4,744,949, 4,752,443, 4,756,881, 4,818,506, 4,834,955, 4,904,413, 4,919,821, 4,923,634, and 4,959,156 and Canadian patent 1,117,395. The disclosures of each of these and the references cited therein are incorporated herein by reference in their entireties. The preferred water-soluble polymers will have molecular weights within the range of from 500 to 300,000, typically from 1,000 to 50,000, e.g., 2,000 to 25,000, as measured by gel permeation chromatography in water.

Among the effective polyacrylates (acrylic polymers) are those including recurring groups represented by the following general formula:

(I)

wherein: each R independently is hydrogen or lower alkyl (e.g., 1 to 4 carbons) and each Y independently is hydroxyl (OH), oxymetalic (OM), oxyorgano (OR), oxyammonium ($ONH_4$), amino ($NR_2$), amino carbosulfonic ($NHRSO_3M$), amino carbosulfonic ester ($NHRSO_3R$) and the like. In these formulae: M is H or a metal, particularly one selected from the group consisting of alkali metals (e.g., Na, K, Li), alkaline earth metals (e.g., Ca, Mg), transition metals (e.g., Zn, Cu, Ni) and mixtures of these; and each R independently is hydrogen or an aliphatic, aromatic, or carbocyclic group and can be saturated or unsaturated, and either substituted or unsubstituted with alkoxy, keto, carboxyamide, polycarboxy, polyhydroxy, carboxylate ester, amino, phosphonic acid, phosphate ester, sulfonic acid, sulfonate salt or ester or other compatible subsistent.

The expressions "acrylic polymer" and "polyacrylate" as used herein include homopolymers, and copolymers, including terpolymers, which comprise one or more of the monomeric residues defined by formula I as recurring units. Other monomers including maleic or itaconic acids and their derivatives and precursors, vinyl acetate (which can be hydrolized after polymerization to polyvinyl alcohol), lower alkyl vinyl ethers, styrene, styrene anhydride, other vinyl monomers (e.g., 3-allyloxy-2-hydroxypropane sulfonic acid), derivatized starches, and the like can also be employed.

By way of further example, residues of maleic acid or itaconic acid or their anhydrides can be employed to prepare effective homopolymers or copolymers including the residues of other monomers. They can be copolymers of two, three or more different monomers. Block copolymers as well as random copolymers can be employed. These homo or copolymers will typically include one or more of the following as recurring units:

(II)

and (III)

wherein each Y independently is as defined above and each Z independently is: hydrogen, lower alkyl (e.g., 1 to 4 carbons), hydroxyl (OH), oxymetalic (OM), oxyorgano (OR), alkylsulfonic ($RSO_3M$), alkylsulfonic ester ($RSO_3R$) and the like and M and R being as defined above.

Among the oxyorgano (OR) substituents are mono and polyhydric alcohol residues, particularly those having from 1 to 4 carbons and up to three hydroxyls. Prominent among these are the residues of methanol, ethanol, ethylene glycol, 1,3-propane diol and 1,3-butane diol, and isomeric forms of these.

The presence of amino ($NR_2$) substituents on the monomers results in acrylamide monomers and polymers. Among these are the following N-, N,N- and mixed acrylamides: methyl, ethyl, propyl, i-propyl, butyl, i-butyl, t-butyl, pentyl, hexyl, carboxy pentyl, methoxy propyl, tris(hydroxy methyl) methyl, (1,2-dicarboxy) ethyl, (1,2-dihydroxy) ethyl, (2,3-dihydroxy) propyl, (2-methyl-1,2-dihydroxy) propyl, 2-(2,4,4-trimethyl pentyl), 2-(2-methyl-4-oxopentyl), and like substituents and their isomers.

Also effective are various sulfonated amides of the above formulae where the amino carbosulfonic groups ($NHRSO_3R$) are represented by the following: 4-aminobenzene sulfonic acid, aminomethane sulfonic acid, 2-aminoethane sulfonic acid, 3-aminobenzene sulfonic acid, 2-amino-2-methyl propyl sulfonic acid ($N(H)_2C(CH_3)_2CH_2SO_3H$) (AMPS), 1-amino-2-hydroxy-3-propane sulfonic acid, and 2,3-hydroxy propylamine.

The amino carbosulfonic ester groups ($NHRS_3R$) of the formula are represented by the alkyl, aralkyl, aryl, and carbocyclic esters of the above amino carbosulfonic groups.

Specific polyacrylate-based polymers include but are not limited to acrylic acid/acrylamide, acrylic acid/vinyl acetate, acrylic acid/acrylate ester, acrylic acid/maleic acid/acrylamidomethylpropane sulfonic acid, and acrylic acid/acrylamido methylpropane sulfonic acid polymers, and combinations thereof.

Among the useful commercially-available low molecular weight polymers are the following:

| Polyacrylates | |
| --- | --- |
| Goodrite K-752 | polyacrylate made in isopropanol from Goodrich, molecular weight (MW) 2,000 |
| Acrysol LMW-20X | polyacrylate from Rohm & Haas, MW 2,000 |
| Acrysol LMW-45X | polyacrylate from Rohm & Haas, MW 4,500 |
| Nalco 1340 | polyacrylic acid, MW 6,000, from Nalco |
| Polymethacrylates | |
| Tamol 850 | Na polymethacrylate, MW 12,000, Rohm & Haas |
| Tamol 960 | Na polymethacrylate, MW 4,200, Rohm & Haas |
| Sulfonated Polymers | |
| Versa TL-4 | Sulfonated styrene anhydride from National Starch |
| AMPS | 2-acrylamido-2-methylpropane sulfonic acid, available as monomer from Lubrizol, also available from Calgon as a copolymer of acrylic acid and AMPS |
| Maleic Anhydride Polymers | |
| Belclene 200 | polymaleate from Ciba Geigy |
| Belclene 283 | polymaleic anhydride terpolymer with ethyl acrylate and vinyl-acetate, MW 1,500, from Ciba Geigy |
| Polyacrylate-Acrylamide-Methacrylate Co- or Ter-polymers | |
| Goodrite KXP-70 | acrylate/methacrylate/t-butylacrylamide terpolymer, 60/20/20 ratio, MW 8,000, from Goodrich |
| TRANSPORT PLUS | polyacrylate-acrylamide copolymer, MW 25,000 from Nalco |
| Polyacrylates Modified with Hydroxy Groups | |
| Gelvatol 40/20 | copolymer of hydrolyzed vinylacetate and vinylalcohol, from |

|  |  |
|---|---|
| Betz 2020 | Monsanto acrylic acid, hyroxypropyl-acrylate copolymer, from Betz |
| Other Carboxylated Polymers |  |
| Goodrite KXP-49 | acrylate and vinylalcohol copolymer, 80/20 ratio, MW 6,000, from Goodrich |

These polymers may be prepared using conventional polymerization techniques. Many, as indicated above, are commercially available. Others can be prepared following the techniques described in the above-identified references.

Phosphonates

The term "phosphonate" includes phosphonic acids, including all polyphosphonic acids and salts and esters of these acids, which are water soluble and effective to suppress hardness in solutions of the type disclosed herein. As with the polymers, there is a wide variety of phosphonates which are commercially available and will be effective for the purposes of the present invention. See U.S. Pat. Nos. 4,303,568 and 4,923,634 which list a number of representative phosphonates. The disclosures of these patents are incorporated herein by reference.

The organophosphonic acid compounds are those having a carbon to phosphorous bond, i.e., $$\begin{array}{c} O \\ \| \\ C-P-OM \\ | \\ OM \end{array} \quad (IV)$$

These compounds can be organized into several groups including the acid, ester and salt forms of the following: organo monophosphonates, organo diphosphonates, amino monophosphonates, and amino polyphosphonates.

Organo Monophosphonates $$\begin{array}{c} O \\ \| \\ R-P-OM \\ | \\ OM \end{array} \quad (V)$$

wherein R is lower alkyl having from about 1 to 6 carbon atoms, (e.g., methyl, ethyl, butyl, propyl, isopropyl, pentyl, isopentyl and hexyl); substituted lower alkyl of from 1 to 6 carbon atoms (e.g., hydroxyl and amino-substituted alkyls); a mononuclear aromatic (aryl) radical (e.g., phenyl, benzyl, etc.) or a substituted mononuclear aromatic compound (e.g., hydroxyl, carboxy, amino, lower alkyl substituted aromatic such as benzyl phosphonic acid); and M is a water-soluble cation, e.g., sodium potassium, ammonium, lithium, etc. or hydrogen.

Specific examples of compounds which are encompassed by this formula include:

methylphosphonic acid
$CH_3PO_3H_2$ ethylphosphonic acid
$CH_3CH_2PO_3H_2$ 2-hydroxyethylphosphonic acid
$$\begin{array}{c} CH_2-CH_2-PO_3H_2 \\ | \\ OH \end{array}$$

isopropylphosphonic acid
$$\begin{array}{c} CH_3 \\ | \\ CH_3-CH-PO_3H_2 \end{array}$$

benzene phosphonic acid
$C_6H_5-PO_3H_2$ benzylphosphonic acid
$C_6H_5CH_2PO_3H_2$ carboxyalkyl phosphonic acid $$\begin{array}{c} PO_3H_2 \\ | \\ H_2C-C-CH_2-CH_2 \\ | \quad | \quad \quad | \\ R^{iv} \; CO_2H \quad R^{iv} \end{array}$$

wherein each $R^{iv}$ independently is hydrogen, a carboxyl ($CO_2H$) group or a phosphono ($PO_3H_2$) group. Among this group is 2-phosphono-1,2,4-tricarboxybutane (PBTC).

Organo Diphosphonates $$\begin{array}{c} R^v \\ | \\ M_2O_3P-C-PO_3M_2 \\ | \\ R^{vi} \end{array}_m \quad (VI)$$

wherein m is an integer (e.g., from 1 to 12); each $R^v$ independently is hydrogen or an alkyl group (e.g., having 1 to 6 carbons); and each $R^{vi}$ independently is hydrogen, hydroxyl or an alkyl group (e.g., from 1 to 6 carbons).

Among the preferred organophosphonic acid compounds for use in the composition of this invention are hydroxy alkylidene diphosphonic acids corresponding to formula (VI) above such as those disclosed in U.S. Pat. Nos. 3,214,454, 3,297,578, and 4,923,634, the disclosures of which are incorporated herein by reference. Also suitable is an alkylene diphosphonic acid corresponding to formula (VI) such as those disclosed in U.S. Pat. No. 3,303,139, the entire disclosure of which is also incorporated herein by reference.

Among the suitable organo diphosphonates are:

methylene diphosphonic acid
$CH_2(PO_3H_2)_2$ ethylidene diphosphonic acid
$(CH_3)CH(PO_3H_2)_2$ isopropylidene diphosphonic acid
$(CH_3)_2C(PO_3H_2)_2$ 1-hydroxy ethylidene-1,1-diphosphonic acid (HEDP)
$H_2O_3P-C(OH)(CH_3)-PO_3H_2$ hexamethylene diphosphonic acid
$H_2O_3P-CH_2(CH_2)_4CH_2-PO_3H_2$ trimethylene diphosphonic acid
$H_2O_3P-(CH_2)_3-PO_3H_2$ decamethylene diphosphonic acid
$H_2O_3P-(CH_2)_{10}-PO_3H_2$

1-hydroxy propylidene diphosphonic acid
$H_2O_3PC(OH)CH_2(CH_3)PO_3H_2$

1,6-dihydroxy-1,6-dimethyl hexamethylene diphosphonic acid
$H_2O_3PC(CH_3)(OH)(CH_2)_4C(CH_3)(OH)PO_3H_2$ dihydroxy diethyl ethylene diphosphonic acid
$H_2O_3PC(OH)(C_2H_5)C(OH)(C_2H_5)PO_3H_2$ -continued 1,4-dihydroxy-1,4-diethyl tetramethylene diphosphonic acid 1,3-dihydroxy-1,3-dipropyl trimethylene diphosphonic acid

1,4-dibutyl tetramethylene diphosphonic acid 4-hydroxy-6-ethyl hexamethylene diphosphonic acid

1-hydroxy butylidene diphosphonic acid
$$H_2O_3P-CH(CH_2)_3-PO_3H_2$$

butylidene diphosphonic acid
$$H_2O_3P-(CH_2)_4-PO_3H_2$$

Amino Phosphonates

(VII)

wherein $R^{vii}$ is a lower alkylene having from about one to about four carbon atoms, or an amine or hydroxy substituted lower alkylene; $R^{viii}$ is $[R^{vii}-PO_3M_2]$, H, OH, amino, substituted amino, an alkyl having from 1 to 6 carbon atoms, a substituted alkyl of from 1 to 6 carbon atoms (e.g., OH, NH$_2$ substituted), a mononuclear aromatic radical or a substituted mononuclear aromatic radical (e.g., OH, NH$_2$ substituted); $R^{ix}$ is $R^{viii}$ or the group represented by the formula wherein $R^x$ and $R^{xi}$ are each hydrogen, lower alkyl of from about 1 to 6 carbon atoms, a substituted lower alkyl (e.g., OH, NH$_2$ substituted), hydrogen, hydroxyl, amino group, substituted amino group, a mononuclear aromatic radical, or a substituted mononuclear aromatic radical (e.g., OH and amine substituted); $R^{xii}$ is $R^x$, $R^{xi}$, or the group $R^{vii}-PO_3M_2$ ($R^{vii}$ is as defined above); n is an integer of from 1 through about 15; y is an integer of from about 1 through about 14; and M is as earlier defined.

Among these is the following:

2-amino-ethylphosphonic acid

Amino Polyphosphonates

(VIII)

wherein $R^{xiii}$ is hydrogen, hydroxyl, or an alkyl (e.g., 1 to 10 carbons) group, aryl (e.g., phenyl) group or aralkyl (e.g., benzyl) group.

Among the amino phosphonic acids of formula (VIII) are

1-aminoethane-1,1-diphosphonic acid

1-aminopropane-1,1-diphosphonic acid 1-aminobenzyl-1,1-diphosphonic acid 1-aminoethane-1,1-diphosphonic acid monethyl ester 1-amino-2-phenylethane-1,1-diphosphonic acid 1,6-diaminohexane-1,1,6,6-tetraphosphonic acid amino poly(alkyl phosphonic acid) (IX)

wherein $R^{xiv}$ is hydrogen, alkyl, aryl, aralkyl, hydroxyl, hydroxy alkyl ($(CH_2)_nOH$) or a phosphono alkyl ($(CH_2)_nPO_3H_2$) group; and n is an integer, typically from 1 to 4.

Among this group are:

amino tri(methylene phosphonic acid) (AMP)
$$N(CH_2PO_3H_2)_3$$

imino-di(methylene phosphonic acid)
$$NH(CH_2PO_3H_2)_2$$

n-butyl-amino-di(methyl phosphonic acid)
$$C_4H_9N(CH_2PO_3H_2)_2$$

decyl-amino-di(methyl phosphonic acid)
$$C_{10}H_{21}N(CH_2PO_3H_2)_2$$

trisodium-pentadecyl-amino-di(methyl phosphonate)
$$C_{15}H_{31}N(CH_2PO_3HNa)(CH_2PO_3Na_2)$$

n-butyl-amino-di(ethyl phosphonic acid)
$$C_4H_9N(CH_2PO_3H_2)_2$$

tetrasodium-n-butyl-amino-di(methyl phosphonate)
C₄H₉N(CH₂CH₂PO₃Na₂)₂ triammonium tetradecyl-amino-di(methyl phosphonate)
C₁₄H₂₉N(CH₂PO₃(NH₄)₂)CH₂-PO₃HNH₄ phenyl amino di(methyl phosphonic acid)
C₆H₅N(CH₂PO₃H₂)₂

4-hydroxy phenyl amino di(methyl phosphonic acid)
HOC₆H₄N(CH₂PO₃H₂)₂ phenyl propyl amino di(methyl phosphonic acid)
C₆H₅(CH₂)₃N(CH₂PO₃H₂)₂ tetrasodium phenyl ethyl amino di(methyl phosphonic acid)
C₆H₅(CH₂)₂N(CH₂PO₃Na₂)₂ n-hexyl amine di(methyl phosphonic acid)
C₆H₁₃N(CH₂PO₃H₂)₂ ethanol amino di(methyl phosphonic acid)
HO(CH₂)₂N(CH₂PO₃H₂)₂ n-hexyl-amino(isopropylidene phosphonic acid) methyl-phosphonic acid
C₆H₁₃N(C(CH₃)₂PO₃N₂)-(CH₂PO₃H₂)

trihydroxy methyl, methyl amino di(methyl phosphonic acid)
(HOCH₂)₃CN(CH₂PO₃H₂)₂ alkyldiamine tetra(alkylene phosphonic acid) (X)

wherein $R^{xv}$ is an alkyl group having 1 to 10 carbons, (e.g., 2 to 6); and n is an integer, (e.g., from 0 to 4 carbons, typically 0 to 1). Prominent among these compounds are:

hexamethylene diamine tetra(methylene phosphonic acid) (HMDTP)
(H₂O₃PCH₂)₂N(CH₂)₆N(CH₂PO₃H₂)₂ ethylene diamine tetra(methylene phosphonic acid) (EDTP)
(H₂O₃PCH₂)₂N(CH₂)₂N(CH₂PO₃H₂)₂ trimethylene diamine tetra(methyl phosphonic acid)
(H₂O₃PCH₂)₂N(CH₂)₃N(CH₂PO₃H₂)₂ hepta methylene diamine tetra(methyl phosphonic acid)
(H₂O₃PCH₂)₂N(CH₂)₇N(CH₂PO₃H₂)₂ decamethylene diamine tetra(methyl phosphonic acid)
(H₂O₃PCH₂)₂N(CH₂)₁₀N(CH₂PO₃H₂)₂ tetradecamethylene diamine tetra(methyl phosphonic acid)
(H₂O₃PCH₂)₂N(CH₂)₁₄N(CH₂PO₃H₂)₂ ethylene diamine tri(methyl phosphonic acid)
(H₂O₃PCH₂)₂N(CH₂)₂NH(CH₂PO₃H₂)

ethylene diamine di(methyl phosphonic acid)
(H₂O₃PCH₂)NH(CH₂)₂NH(CH₂PO₃H₂)

chloroethylene amine di(methyl phosphonic acid)
ClCH₂CH₂N(CH₂PO₃H₂)₂ dialkylene triamine penta (alkylene phosphonic acid) (XI)

$$\begin{array}{ccc} H_2O_3P(CH_2)_n & & (CH_2)_nPO_3H \\ | & & | \\ N-(CH_2)_m-N-(CH_2)_m-N \\ | & | & | \\ H_2O_3P(CH_2)_n & (CH_2)_n & (CH_2)_nPO_3H \\ & | & \\ & PO_3H_2 & \end{array}$$

wherein m and n are as defined above. Among this group are diethylene triamine penta(methylene phoshonic acid)
(H₂O₃PCH₂)₂N(CH₂)₂N(CH₂PO₃H₂)—(CH₂)₂N(CH₂PO₃H₂)₂

Among other phosphonates are trietylene tetra amine hexa(methyl phosphonic acid)
(H₂O₃PCH₂)₂N(CH₂PO₃H₂) (CH₂)₂N—(CH₂PO₃H₂) (CH₂)₂N(CH₂PO₃H₂)₂ monoethanol diethylene triamine tri(methyl phosphonic acid)
HOCH₂CH₂N(CH₂PO₃H₂) (CH₂)₂NH—(CH₂)₂N(CH₂PO₃H₂)₂

The water-soluble salts of these acids include the alkali metal, ammonium, amine, lower alkanolamine salts, and like salts. Among the suitable esters are the lower alkyl (e.g., methyl and ethyl) esters. Mixtures of the organophosphonic acid compounds described above are also contemplated.

Phosphates

Phosphates can be employed alone or with other hardness-suppressing compositions in amounts effective to suppress hardness. Among the suitable inorganic phosphates are the acid forms of inorganic phosphate and any of their metal, ammonium or amine salts. Representative of the inorganic phosphates (ortho and condensed) are those chosen from the group: orthophosphates, pyrophosphates, tripolyphosphates, hexametaphosphates, and higher molecular weight polyphosphate oligomers. Also effective are organo phosphates such as phosphate esters, especially those of a type represented by the following structures:

where $R^{xvi}$=(CH₂CH₂O)$_q$PO₃H₂, and q is an integer, e.g., 1 to 2;

N+(CH₂CH₂O)$_q$PO₃H₂]₃ where q is as defined above.

Any of these phosphates may be used alone or in combination. Orthophosphates and condensed (polyphosphates) are preferred. Preferably, a combination of at least one polyphosphate and one of the other phosphates will be utilized.

Chelants

The invention can take advantage of conventional chelants, alone or in combination with other hardness-suppressing compositions, in amounts effective to suppress hardness. Among these are ethylene diamine tetracetic acid (EDTA), nitrilotriacetic acid (NTA), N-hydroxy ethyl ethylene diamine tetracetic acid, hydroxyethylene diamine triacetic acid (HEDTA), citric acid, diethylenetriamine pentacetic acid, gluconic acid, tartaric acid, glucoheptonic acid, and the water-soluble salts of these.

EXAMPLES

The following examples further illustrate and explain the invention. Unless otherwise indicated, all parts and percentages are by weight, and hardness values for total hardness, calcium and magnesium are always expressed as parts per million calcium carbonate.

A series of test solutions was prepared having the following common characteristics:

| | |
|---|---|
| Total hardness (as $CaCO_3$) | 450 to 900 ppm |
| Calcium/Magnesium (ppm ratio) | 2:1 to 5:1 |
| pH | 9.3 to 9.7 |
| $NaHCO_3$ Alkalinity (as $CaCO_3$) | 200 ppm |
| Silica (as $SiO_2$) | 150 ppm |
| Minimum Conductivity (approx.) | 5300 micromhos |
| Urea Solution Concentrations | 5%, 10% and 15% |

Ca/Mg ratios were varied between 2:1 and 5:1 as a function of total hardness. As a consequence of the Ca/Mg ratio, $Mg^{2+}$ (as $CaCO_3$) was either 150, 200 or 300 ppm, with most experiments done at 150 or 200 ppm.

Test solutions employed the following hardness-suppressing compositions in the amounts indicated in the tables that follow:

| | |
|---|---|
| PAA — | Polyacrylic acid (MW approximately 2000) |
| AMS — | 37% actives acid form terpolymer of acrylamide/acrylic acid/sulfomethyl acrylamide (pH-5) |
| PBTC — | 2-phosphono-1,2,4-tricarboxybutane |
| HEDP — | 1-hydroxyethylidene-1,1-diphosphonic acid. |

Table 1 shows the results of experiments in simulated cooling water blowdown containing 150 ppm $SiO_2$ with total hardness values, "H" varying between 450–900 ppm, as $CaCO_3$. The data describing scale control is expressed in terms of observations such as "scale/no scale" and the four following parameters:

% $Ca^{2+}$ Inhibition (I)

% Dispersancy (D)

% Retained $Mg^{2+}$

% Retained $SiO_2$

Percent $Ca^{2+}$ Inhibition (I) is based on the NACE* Method for calculating inhibition. The data is from ICP analysis of filtered solutions. With respect to just I, better performance is associated with high % Ca Inhibition.

* National Association of Corrosion Engineers (NACE) Standard Test Method TM-0374-90 (Item No. 53023). The NACE procedure is recommended by the Technical Practices Committee for the testing of calcium carbonate and calcium sulfate precipitation. The details of the NACE procedure may be found in "Laboratory Screening Tests to Determine the Ability of Scale Inhibitors to Prevent the Precipitation of Calcium Sulfate and Calcium Carbonate from Solution," approved in November, 1974 and revised in January 1990.

Percent Dispersancy (D) is a simple mathematical percentage, expressed by the following calculation:

$$D = \frac{(UF\text{ "}H\text{"} - F\text{ "}H\text{"}) \times 100}{\text{Theoretical "}H\text{"}}$$

*National Association of Corrosion Engineers (NACE) Standard Test Method TM-0374-90 (Item No. 53023). The NACE procedure is recommended by the Technical Practices Committee for the testing of calcium carbonate and calcium sulfate precipitation. The details of the NACE procedure may be found in "Laboratory Screening Tests to Determine the Ability of Scale Inhibitors to Prevent the Precipitation of Calcium Sulfate and Calcium Carbonate from Solution," approved in November, 1974 and revised in January 1990.

where

H equals total hardness

UF (unfiltered)

F (filtered)

The value of D is derived from EDTA total hardness analysis of experimental solutions before and after filtering. Percent dispersancy is simply that fraction of water hardness which is not water soluble and not precipitated adherent scale. This means it is a measure of dispersed particles which can be filtered by an 0.45 micron millipore filter. If a particle is smaller than 0.45 microns and thus not filtered, it is considered soluble hardness". High % Dispersancy is associated with high % Retention of $Mg^{2+}$ and $SiO_2$ and increasing total water hardness test conditions. Typically, as total hardness increases, the achievable I decreases and D increases. This is a function of increasing levels of $Ca^{2+}$.

Percent retained $Mg^{2+}$ and $SiO_2$ are simple mathematical percentages derived by dividing the values obtained by inductively-coupled plasma spectroscopy (ICP) analysis of filtered solutions, by the theoretical concentrations of each. Because of the experimental and analytical methods used, 100%±7% probably represents full recovery of $Mg^{2+}$ and $SiO_2$ for both components. A Retention value of <93% for either $Mg^{2+}$ or $SiO_2$ means the scale control result for a given experiment is, at best, marginal, even if the other component gives 100% retention.

As a consequence of the above definitions, a good or acceptable result will exhibit the following characteristics:

(1) Combined I and D total~80%, (2) No observed scale on glass, and (3) % retained $Mg^{2+}$ and $SiO_2$ equal to 100% each.

For a given series of hardness experiments, the best result may only be marginal. For example, experiment E7 (Table 1) gives the best result of a series, but by definition may be considered marginal. In this example, based on laboratory experiences, it is believed that adequate performance would be observed in the field because the $Mg^{2+}$ concentration is ≦150 ppm.

TABLE 1

SCALE CONTROL IN SYNTHESIZED HIGH SILICA WATER SAMPLES

| Expt # | Urea (%) | ppm Suppressor HEDP | ppm Suppressor AMS | ppm Suppressor PAA | ppm Suppressor PBTC | Input Hardness ppm | Ratio Ca/Mg | % $Ca^{2+}$* Inhibition | % Dispersancy | % Retained Mg | % Retained $SiO_2$ | Notes |
|---|---|---|---|---|---|---|---|---|---|---|---|---|
| A7 | 10 | 15 | — | 65 | — | 450 | 2:1 | 76 | 4 | 80 | 87 | |
| C7 | 10 | 15 | 66.3 | 65 | 18 | 450 | 2:1 | 72 | 9 | 87 | 100 | |
| B7 | 15 | 22.5 | — | 97.5 | — | 450 | 2:1 | 62 | 14 | 87 | 93 | |
| D7 | 15 | 22.5 | 66.6 | 97.5 | 18 | 450 | 2:1 | 72 | 9 | 87 | 93 | |
| F7 | 15 | 22.5 | 66.6 | 97.5 | 18 | 450 | 2:1 | 65 | 10 | 87 | 100 | 75 ppm $H_3BO_3$ |
| E7 | 15 | 22.5 | 111 | 97.5 | 30 | 450 | 2:1 | 70 | 8 | 93 | 107 | ** |
| A8 | 10 | 15 | — | 65 | — | 600 | 2:1 | 66 | 7 | 65 | 73 | floc |
| D8 | 10 | 15 | 111 | 65 | 30 | 600 | 2:1 | 69 | 10 | 90 | 93 | |
| B8 | 15 | 22.5 | — | 97.5 | — | 600 | 2:1 | 61 | 20 | 100 | 100 | ** |
| E8 | 15 | 22.5 | 111 | 97.5 | 30 | 600 | 2:1 | 66 | 16 | 90 | 93 | |
| C8 | 15 | 22.5 | — | 97.5 | — | 600 | 3:1 | 52 | 29 | 100 | 107 | ** |
| F8 | 15 | 22.5 | 111 | 97.5 | 30 | 600 | 3:1 | 56 | 26 | 100 | 100 | ** |
| G7 | 10 | 15 | — | 65 | — | 900 | 2:1 | 44 | 9 | 67 | 61 | massive floc |
| H7 | 10 | 15 | 111 | 65 | 30 | 900 | 2:1 | 49 | 12 | 57 | 65 | floc |
| I7 | 10 | 15 | 111 | 65 | 30 | 900 | 2:1 | 51 | 12 | 53 | 55 | 75 ppm $H_3BO_3$ |
| J7 | 10 | 15 | 222 | 65 | 60 | 900 | 2:1 | 56 | 15 | 60 | 63 | light floc |
| G8 | 10 | 15 | — | 65 | — | 900 | 5:1 | 31 | 42 | 87 | 107 | scale |
| H8 | 10 | 15 | 66.6 | 65 | 30 | 900 | 5:1 | 28 | 36 | 100 | 107 | gel film |
| I8 | 10 | 15 | 222 | 65 | 60 | 900 | 5:1 | 50 | 32 | 100 | 113 | ** |

*Filtered, ICP, Calculation using NACE Method
**Best of Series

TABLE 2

DISPERSANCY EFFECT OF SUPPRESSORS IN SYNTHESIZED HIGH-SILICA WATER SAMPLES

| Expt # | Urea (%) | ppm Suppressor HEDP | ppm Suppressor AMS | ppm Suppressor PAA | ppm Suppressor PBTC | Theoretical Hardness ppm | Ratio Ca/Mg | ppm Total Hardness* (U) unfiltered | ppm Total Hardness* (F) filtered | UF-F | D % Dispersancy |
|---|---|---|---|---|---|---|---|---|---|---|---|
| A7 | 10 | 15 | — | 65 | — | 450 | 2:1 | 362 | 346 | 16 | 4 |
| C7 | 10 | 15 | 66.6 | 65 | 18 | 450 | 2:1 | 390 | 350 | 40 | 9 |
| B7 | 15 | 22.5 | — | 97.5 | — | 450 | 2:1 | 396 | 334 | 62 | 14 |
| D7 | 15 | 22.5 | 66.6 | 97.5 | 18 | 450 | 2:1 | 388 | 348 | 40 | 9 |
| F7 | 15 | 22.5 | 66.6 | 97.5 | 18 | 450** | 2:1 | 392 | 346 | 46 | 10 |
| E7 | 15 | 22.5 | 111 | 97.5 | 30 | 450 | 2:1 | 396 | 362 | 34 | 8 |
| A8 | 10 | 15 | — | 65 | — | 600 | 2:1 | 424 | 380 | 44 | 7 |
| D8 | 10 | 15 | 111 | 65 | 30 | 600 | 2:1 | 514 | 454 | 60 | 10 |
| B8 | 15 | 22.5 | — | 97.5 | — | 600 | 2:1 | 550 | 430 | 120 | 20 |
| E8 | 15 | 22.5 | 111 | 97.5 | 30 | 600 | 2:1 | 546 | 450 | 96 | 16 |
| C8 | 15 | 22.5 | — | 97.5 | — | 600 | 3:1 | 548 | 372 | 176 | 29 |
| F8 | 15 | 22.5 | 111 | 97.5 | 30 | 600 | 3:1 | 556 | 400 | 156 | 26 |
| G7 | 10 | 15 | — | 65 | — | 900 | 2:1 | 560 | 482 | 78 | 9 |
| H7 | 10 | 15 | 111 | 65 | 30 | 900 | 2:1 | 614 | 510 | 104 | 12 |
| I7 | 10 | 15 | 111 | 65 | 30 | 900 | 2:1 | 604 | 492 | 112 | 12 |
| J7 | 10 | 15 | 222 | 65 | 60 | 900 | 2:1 | 666 | 534 | 132 | 15 |
| G8 | 10 | 15 | — | 65 | — | 900 | 5:1 | 756 | 376 | 380 | 42 |
| H8 | 10 | 15 | 111 | 65 | 30 | 900 | 5:1 | 796 | 470 | 326 | 36 |
| I8 | 10 | 15 | 222 | 65 | 60 | 900 | 5:1 | 814 | 530 | 284 | 32 |

*Total Hardness Ca and Mg by EDTA Titration
**Plus 75 ppm $H_3BO_3$

Data in Table 1 show that in the hardness range of 450 to 600 ppm "H", at 15% urea, PAA and HEDP could be used alone, but the results indicate this is a borderline situation. Improved results are obtained for these components at 600 ppm "H" when the Ca/Mg ratio is raised to 3:1 from 2:1 and by definition limiting $Mg^{2+}$ to 150 ppm. The data for hardness values at 600 ppm are unclear as to the absolute need for using a dispersant additive including AMS and PBTC; however, it appears that a dosage of 180 to 300 ppm AMS and 18 to 30 ppm PBTC could be beneficial.

As hardness level increases above 600 ppm, it is quite clear that the use of 300 to 600 ppm AMS and 30 to 60 ppm PBTC is required. Acceptable scale control is not found without it. In addition, the data show that the Ca/Mg ratio must be raised to 5:1 as total hardness approaches 900 ppm, and thus effectively limits Mg to 200 ppm and preferably 150 ppm.

At 900 ppm "H" and 10% urea, the recommended use concentrations for PAA and HEDP are 15 and 65 ppm respectively, even with Ca/Mg ratios increased to 5:1. The reasons for decreasing the PAA and HEDP concentration are the requirements for lower urea solids, ionic strength and alkalinity as total hardness levels approach approximately 900 ppm.

The 900 ppm "H" data in Table 1 show the interrelationships that exist among Ca/Mg ratios, "H", and concentrations of PAA and HEDP and the combination of AMS and PBTC with respect to acceptable scale control. For example, at 2:1 Ca/Mg ratio, acceptable performance cannot be achieved. At a 5:1 Ca/Mg ratio, acceptable performance can be achieved but at least 300 ppm AMS and 30 ppm PBTC are required.

The concept of "Dispersancy" and its importance to scale control in high-hardness, high-silica (150 ppm $SiO_2$) water is shown in Tables 1 and 2. For example, as "H" increases and the concentration of $Ca^{2+}$ increases, stabilization of $Ca^{2+}$ (I) in a soluble form (particles <0.45 microns as measured by filtration through a 0.45 millipore filter)

Silica can be tolerated at levels of 150 ppm $SiO_2$ at hardness levels up to 900 ppm providing $Mg^{2+}$ is limited to 150 ppm by controlling the Ca/Mg ratio to about 5:1. At total hardness levels above 900 ppm, extensive studies have not been made; however, data in Table 3 suggest that even low levels, e.g., 30 to 60 ppm $SiO_2$, may not be readily tolerated. For example, the 2,250 ppm results in Table 3 suggest that nearly all the $Mg^{2+}$ would have to be removed and Ca/Mg ratios of at least 15–20:1 will be required.

TABLE 3

EFFECT OF HIGH CONCENTRATIONS OF SILICA ON SCALE CONTROL

| Theoretical Water "H"/"M" (ppm as $CaCO_3$) | $SiO_2$ (ppm) | Ratio Ca/Mg | Urea (%) | HEDP | AMS | PAA | PBTC | % $Ca^{2+}$* Inhibition | % Dispersancy | % Retention $Mg^{2+}$ | % Retention $SiO_2$ | Notes |
|---|---|---|---|---|---|---|---|---|---|---|---|---|
| 450/300 | 0–60 | 2:1 | 5–15 | 7.5–22.5 | — | 32.5–97.5 | — | 72–79 | — | 100 | 100 | |
| 450/300 | 150 | 2:1 | 10 | 15 | — | 65 | — | 76 | 4 | 80 | 87 | |
| 450/200 | 150 | 2:1 | 15 | 22.5 | 111 | 97.5 | 30 | 70 | 8 | 93 | 107 | |
| 900/150 | 0 | 2:1 | 10 | 15 | 111 | 65 | 30 | 57 | — | 103 | — | |
| 900/200 | 150 | 2:1 | 10 | 15 | — | 65 | — | 44 | 9 | 67 | 67 | massive floc |
| 900/200 | 150 | 2:1 | 10 | 15 | 222 | 65 | 60 | 56 | 15 | 60 | 63 | |
| 900/200 | 150 | 5:1 | 10 | 15 | 222 | 65 | 60 | 50 | 32 | 100 | 113 | |
| 2,500/0 | 0 | 2:1 | 2.5 | 3.75 | 222 | 16.25 | 60 | 87 | 8 | 100+ | — | |
| 2,250/100 | 0 | 2:1 | 15 | 22.5 | — | 97.5 | — | 17 | — | 83 | — | scale |
| 2,250/100 | 0 | 2:1 | 15 | 22.5 | 222 | 97.5 | 6 | 22 | — | 88 | — | scale |
| 2,250/100 | 150 | 2:1 | 15 | 22.5 | 222 | 97.5 | 6 | 10 | — | 53 | 26 | scale |

*NACE Method of Calculation becomes more difficult. Instead, scale control becomes more dependent on dispersancy of very small particles of $CaCO_3$. The size of these particles has not been measured but is estimated, based on filtration results, to average only slightly more than 0.45 microns. This is demonstrated with experiment I8 in Table 1 where the combination of 10% urea, 15 ppm PAA, 65 ppm HEDP, 600 ppm AMS and 60 ppm PBTC gives 32% D and 50% I. A lower concentration of a combination of AMS and PBTC maintains dispersancy but at the cost of an appreciable loss in I and overall performance.

With respect to $Mg^{2+}$ and $SiO_2$, the presence of a combination of AMS and PBTC is important; however, it is more important to control the concentration of $Mg^{2+}$. As total hardness approaches 900 ppm, the Ca/Mg ratio must be increased to 4 to 5:1 and hence $Mg^{2+}$ to 150 ppm if $Mg^{2+}$ and $SiO_2$ is to be prevented from precipitating and adding to the $CaCO_3$ scale. This is shown by the results in Table 1.

The importance of dispersancy in high hardness, high silica water, to overall performance and thus the need for a combination of AMS and PBTC is best illustrated with experiment I8 in Table 2. In this experiment, 814 ppm "H" of an initial input 900 ppm "H" is recovered. In addition, all input $Mg^{2+}$ and $SiO_2$ is recovered, and no scale is observed.

Table 3 compares the performance of several combinations of PAA with HEDP and AMS with PBTC in waters containing "H" ranging from 450 to 2,250 ppm and silica from 0 to 150 ppm $SiO_2$. The data show that, up to 450 ppm "H" (2:1 Ca/Mg), silica is not a problem at levels up to at least 60 ppm. In fact, at 15% urea, with 22.5 ppm PAA, 97.5 ppm HEDP and 300 ppm AMS and 30 ppm PBTC, at least borderline acceptable results are achieved up to 150 ppm $SiO_2$ in 2:1 Ca/Mg water.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims. The claims are meant to cover the claimed elements and steps in any arrangement or sequence which is effective to meet the objectives there intended, unless the context specifically indicates the contrary.

We claim:

1. An improvement in a process for controlling emissions which conserves water usage and reduces waste water discharge, the process including burning fuel with air to produce heat and utilizes water as a heat transfer medium, the process resulting in the production of waste water and combustion gases containing $NO_x$, and introducing an aqueous solution of $NO_x$-reducing agent into the combustion gases under conditions effective to reduce the $NO_x$ concentration thereof, the improvement comprising:

recovering the waste water at the site of combustion;

mixing a $NO_x$-reducing agent with the waste water and a hardness-suppressing composition in sufficient quantities to provide an aqueous solution of the $NO_x$-reducing agent effective for reducing the $NO_x$ concentration of the combustion gases while moderating the tendency for precipitation of hardness factors;

wherein the aqueous solution of $NO_x$-reducing agent is prepared by admixing said waste water, an effective NH-containing composition, and a hardness-suppressing composition comprising at least one member selected from the group consisting of water-soluble or water-dispersible polymers, phosphonates, chelants, phosphates and mixtures thereof, of a composition and in an amount effective to moderate the tendency for precipitation of hardness factors comprising at least calcium; and wherein the $NO_x$-reducing agent comprises an NH-containing composition comprising a member selected from the group consisting of ammonia, urea, urea hydrolysis products, carbamates, ammonium carbonate, ammonium bicarbonate, cyanurates, ammonium salts, and mixtures of two or more of these;

following mixing of the $NO_x$-reducing agent with the waste water and a hardness-suppressing composition, contacting the combustion gases with the aqueous solution of $NO_x$-reducing agent under conditions effective to achieve selective gas phase reaction of the $NO_x$-reducing agent with the $NO_x$.

2. An improved process according to claim 1 wherein the aqueous solution of $NO_x$-reducing agent is prepared by diluting a concentrate comprising from 15 to 60% of $NO_x$-reducing agent and from 0.05 to 1.0% of the hardness-suppressing composition.

3. An improved process according to claim 2 wherein the $NO_x$-reducing agent comprises urea or at least one of its hydrolysis products or a salt thereof.

4. An improved process according to claim 3 wherein the aqueous solution comprises both a water-soluble polymer and a phosphonic acid or salt of a phosphonic acid as hardness-suppressing compositions.

5. An improvement in a process for producing and utilizing steam while controlling emissions, the process comprising burning fuel with air to produce hot combustion gases containing $NO_x$, transferring heat from the combustion gases to water to produce steam, passing the steam to a device which utilizes at least a portion of the energy of the steam and produces spent steam, cooling the spent steam by indirect heat transfer with cooling water, cooling the cooling water by direct contact with air causing evaporation, and introducing an aqueous solution of $NO_x$-reducing agent into the combustion gases under conditions effective to reduce the $NO_x$ concentration thereof by selective gas phase reaction, the improvement comprising;

following cooling of the cooling water, separating a portion of the cooling water from the remainder and mixing it with a $NO_x$-reducing agent in sufficient quantity to provide an aqueous solution of the $NO_x$-reducing agent effective for reducing the $NO_x$ concentration of the combustion gases;

wherein the $NO_x$-reducing agent comprises an NH-containing composition comprising a member selected from the group consisting of ammonia, urea, urea hydrolysis products, carbamates, ammonium carbonate, ammonium bicarbonate, cyanurates, ammonium salts, and mixtures thereof.

6. A process according to claim 5 wherein, following cooling of the cooling water, a portion of the cooling water is separated from the rest, treated by the addition of a hardness suppressing composition to reduce hardness of that portion and recombined with the remainder of the cooling water.

7. A process according to claim 6 wherein the portion of the cooling water which is treated is mixed with an additive to reduce the hardness of that portion.

8. A process according to claim 6 wherein the portion of cooling water which is treated is subjected to a process selected from the group consisting of reverse osmosis, electrodialysis reversal, other bipolar membrane technology and vapor recompression.

9. A process according to claim 5 wherein the aqueous solution of $NO_x$-reducing agent is prepared by admixing cooling water after it has been cooled, an NH-containing composition, and a hardness-suppressing composition comprising at least one member selected from the group consisting of water-soluble or water-dispersible polymers, phosphonates, chelants, phosphates and mixtures thereof, in an amount effective to moderate the tendency for precipitation of hardness factors comprising at least calcium.

10. A process according to claim 9 wherein the concentration of the hardness-suppressing composition is sufficient to enable protection against calcium scale formation at calcium concentrations of from 400 to 2500 parts per million.

11. A process according to claim 9 wherein the pH of the aqueous solution is at least 7.

12. An improved process according to claim 9 wherein the aqueous solution of $NO_x$-reducing agent is prepared by diluting a concentrate comprising from 15 to 60% of the $NO_x$-reducing agent and from 0.05 to 1.0% of the hardness-suppressing composition.

13. An improved process according to claim 9 wherein the $NO_x$-reducing agent comprises urea or at least one of its hydrolysis products or a salt of a urea hydrolysis product.

14. An improved process according to claim 9 wherein the aqueous solution comprises both a water-soluble polymer and a phosphonic acid or salt of a phosphonic acid as hardness-suppressing compositions.

15. An improvement in a process for driving a turbine wherein fuel is burned with air to produce hot combustion gases containing $NO_x$; heat is transferred from the combustion gases to water to produce steam; steam is passed to a turbine to produce mechanical energy; steam from the turbine is cooled by indirect heat transfer with cooling water; the cooling water is cooled by direct contact with air causing evaporation; and an aqueous solution of $NO_x$-reducing agent is introduced into the combustion gases under conditions effective to reduce the $NO_x$ concentration thereof, the improvement comprising:

following cooling the cooling water by contact with air, treating a portion of the cooling water to reduce the hardness of that portion, combining the resulting treated water and make-up with the remainder of the cooling water to maintain total hardness within the range of 400 to 2500 ppm, silicate hardness at from 50 to 250 ppm and a ratio of calcium to magnesium at greater than 2:1; and, then separating a portion of the cooling water from the remainder and mixing it with $NO_x$-reducing agent in sufficient quantity to provide an aqueous solution of the $NO_x$ concentration of the combustion gases;

wherein the aqueous solution of $NO_x$-reducing agent is prepared by admixing said waste water, an effective NH-containing composition, and a hardness-suppressing composition comprising at least one member selected from the group consisting of water soluble or water dispersible polymers, phosphonates, chelants, phosphates and mixtures thereof in an amount effective to moderate the tendency for precipitation of hardness factors comprising calcium, magnesium and silicate; and wherein the $NO_x$-reducing agent comprises an NH-containing composition comprising a member selected from the group consisting of ammonia, urea, urea hydrolysis products, carbamates, ammonium carbonate, ammonium bicarbonate, cyanurates, ammonium salts, and mixtures thereof.

16. A process according to claim 15 wherein the portion of the cooling water which is treated is contacted with an additive to reduce the hardness of that portion.

17. A process according to claim 15 wherein the portion of cooling which is treated is subjected to reverse osmosis.

18. An improved process according to claim 15 wherein the aqueous solution of $NO_x$-reducing agent is prepared by diluting a concentrate comprising from 15 to 60% of $NO_x$-reducing agent and from 0.05 to 1.0% of the hardness-suppressing composition.

19. An improvement in a process for producing and utilizing steam while controlling emissions, the process comprising burning fuel with air to produce hot combustion gases containing $NO_x$, transferring heat from the combustion gases to boiler water to produce steam, passing the steam to a device which utilizes at least a portion of the energy of the steam and produces spent steam, cooling the spent steam by indirect heat transfer to produce liquid boiler water, and introducing an aqueous solution of $NO_x$-reducing agent into the combustion gases under conditions effective to reduce the $NO_x$ concentration thereof, the improvement comprising:

separating a portion of the boiler water from the remainder and mixing it with $NO_x$-reducing agent in sufficient quantity to provide an aqueous solution of the $NO_x$-reducing agent effective for reducing the $NO_x$ concentration of the combustion gases;

wherein the $NO_x$-reducing agent comprises an NH-containing composition comprising a member selected from the group consisting of ammonia, urea, urea hydrolysis products, carbamates, ammonium carbonate, ammonium bicarbonate, cyanurates, ammonium salts, and mixtures thereof.

20. A process according to claim 19 wherein the aqueous solution of $NO_x$-reducing agent is prepared by admixing said boiler water, an effective NH-containing composition, and a hardness-suppressing composition comprising at least one member selected from the group consisting of water-soluble and water-dispersible polymers, phosphonates, chelants, phosphates and mixtures thereof in an amount effective to moderate the tendency for precipitation of hardness factors comprising calcium, magnesium, and silicate.

21. An improved process according to claim 19 wherein the aqueous solution of $NO_x$-reducing agent is prepared by diluting a concentrate comprising from 15 to 60% of $NO_x$-reducing agent and from 0.05 to 1.0% of the hardness-suppressing composition.

* * * * *